United States Patent
Beck et al.

[11] Patent Number: 5,840,786
[45] Date of Patent: Nov. 24, 1998

[54] PLASTISOL COMPOSITION

[75] Inventors: Michael Beck, Duesseldorf; Lutz Jeromin, Hilden; Christiane Hoeltgen, Duesseldorf; Wolfgang Ritter, Haan, all of Germany

[73] Assignee: Henkel Kommanditgesellschaft auf Aktien, Duesseldorf, Germany

[21] Appl. No.: 902,509

[22] Filed: Jul. 29, 1997

Related U.S. Application Data

[63] Continuation of Ser. No. 663,034, filed as PCT/EP94/04000, Dec. 1, 1994 published as WO95/15994, Jun. 15, 1995, abandoned.

[30] Foreign Application Priority Data

Dec. 10, 1993 [DE] Germany .......................... 43 42 089.2

[51] Int. Cl.$^6$ ...................................................... C08L 83/00
[52] U.S. Cl. .......................... 523/201; 524/502; 524/801; 524/807; 524/857
[58] Field of Search ............................. 523/201; 524/502, 524/801, 807, 857

[56] References Cited

FOREIGN PATENT DOCUMENTS

| 261499 | 3/1988 | European Pat. Off. . |
|---|---|---|
| 333538 | 9/1989 | European Pat. Off. . |
| 0358181 | 3/1990 | European Pat. Off. . |
| 0557944 | 9/1993 | European Pat. Off. . |
| 0624606 | 11/1994 | European Pat. Off. . |
| 2454235 | 5/1976 | Germany . |
| 2529732 | 1/1977 | Germany . |
| 4034725 | 5/1992 | Germany . |
| 4139382 | 6/1992 | Germany . |
| 9207906 | 3/1992 | WIPO . |

OTHER PUBLICATIONS

Paul E. Bruins, Plasticizer Technology [Reinhold Publishing Corporation, New York], vol. 1, pp. 228–232.

*Primary Examiner*—Randy Gulakowski
*Attorney, Agent, or Firm*—Ernest G. Szoke; Wayne C. Jaeschke; Martin G. Meder

[57] ABSTRACT

The invention relates to a plastisol composition based on bead polymers. The bead polymers preferably have a core/shell structure and an average diameter of 1 to 150 μm. The bead polymers are preferably chlorine-free and are made up at least of a) styrene, α-methyl styrene and/or p-methyl styrene on the one hand and b) 2 to 20% by weight (based on the copolymer) of olefinically unsaturated carboxylic acids. The plastisol composition according to the invention may be used for the production of coating compositions, sealing compounds and adhesives.

27 Claims, No Drawings

PLASTISOL COMPOSITION

This application is a continuation, of application Ser. No. 08/663,034, filed as PCT/EP94/04000, Dec. 1, 1994 published as WO95/15994, Jun. 15, 1995 now abandoned.

BACKGROUND OF THE INVENTION

1. Field of the Invention

This invention relates to a novel plastisol composition based on bead polymers, plasticizers and inorganic fillers and, optionally, other typical additives.

2. Discussion of Related Art

Plastisols are generally understood to be dispersions of organic plastics in plasticizers which gel on heating to relatively high temperatures and harden on cooling. At present, the most widely used plastisols in practice predominantly contain finely powdered polyvinyl chloride (PVC) which is dispersed in a liquid plasticizer and forms a paste. Polyvinyl chloride plastisols of this type are employed for various applications. They are used inter alia as sealing compounds, for example for sealing seams in metal containers or as a flanged seam adhesive in the metal industry, as corrosion-inhibiting coatings for metals (for example as an undersealing compound for motor vehicles), for impregnating and coating substrates of textile materials (for example as a carpet backing), as cable insulations, etc.

Unfortunately, the production and use of PVC plastisols involves a number of problems. Even the production of PVC itself is not without problems because the health of production personnel is endangered by the monomeric vinyl chloride. In addition, residues of monomeric vinyl chloride in the PVC could even be a health hazard during subsequent processing or to end users although, in general, the content is only in the ppb range.

A particular difficulty of using PVC plastisols is that the PVC is sensitive to both heat and light and tends to give off hydrogen chloride. This is a serious problem, particularly when the plastisol has to be heated to a relatively high temperature because the hydrogen chloride released under these conditions has a corrosive effect and attacks metallic substrates. This applies in particular when comparatively high stoving temperatures are applied to shorten the gelation time or when locally high temperatures occur, as in spot welding.

The greatest problem arises in the disposal of PVC-containing waste. In addition to hydrogen chloride, dioxins—which are known to be highly toxic—can be formed in certain circumstances. In conjunction with scrap steel, PVC residues can lead to an increase in the chloride content of the steel melt, which is another disadvantage.

Accordingly, the problem addressed by the present invention was to develop a polyvinyl chloride-free plastisol composition which would be equivalent in its performance properties to PVC plastisols.

Polyurethane- or acrylate-based coating compositions are already known and are used instead of PVC plastisols, for example in the automotive industry.

In terms of practical application, two-component polyurethane systems differ fundamentally from typical plastisols insofar as the complicated equipment required for their application is generally not available to the users.

One-component polyurethane systems are also known, but are all attended by a number of other disadvantages, namely:

Moisture-curing systems have a high viscosity and, accordingly, cannot be applied without a solvent.

In the case of systems containing blocked isocyanate groups, the volatility of the blocking agent can lead to bubble formation in thick layers, in addition to which the temperature range of 150° C. to 180° C. used for application is often impossible to adhere to for the stoving conditions.

On account of the water to be evaporated, water-containing PU dispersions cannot be accommodated in the usual production cycle.

Microencapsulated polyurethane systems lack shear stability, resulting in gelation in the pumps during application.

Although acrylate plastisols of the type known from DE-B-24 54 235 and DE-B-25 29 732 largely satisfy the technical requirements mentioned at the beginning, the necessary acrylate polymers are again far more expensive than polyvinyl chloride so that the use of acrylate plastisols has hitherto been confined to special applications, for example as spot welding pastes, where PVC plastisols fail completely. Plastisols based on styrene/acrylonitrile copolymers according to EP-A-261 499 are also not a satisfactory solution on account of their inadequate abrasion resistance and/or stability in storage.

DE-A-41 39 382 proposes plastisols based on core/shell polymers in which the core of the polymer particles is formed by a diene elastomer while the shell consists of a continuous layer of a methyl methacrylate resin, an acrylonitrile resin or a vinyl chloride polymer.

Although the first two of the above-mentioned shell materials meet the need for a chlorine-free polymer, polymer particles with a high percentage content of hard shell material are required for storable plastisols. Since these polymer components are at least partly incompatible with the plasticizer, heterodisperse systems are formed after the gelation process and do not enable optimal performance properties to be established. Although vinyl chloride polymer as shell material reduces the percentage chlorine content compared with pure PVC plastisols, these polymers are only an unsatisfactory partial solution to the problem because they are not chlorine-free.

According to DE-A-40 34 725, plastisol compositions with excellent performance properties including, in particular, high stability in storage, good adhesion to metals, high abrasion resistance and good mechanical properties can be obtained by using as the organic polymer component styrene copolymer powders produced by emulsion polymerization which contain a) styrene and/or α-methyl styrene and/or p-methyl styrene and b) 3 to 20% by weight (based on the copolymer) of methacrylic acid and/or acrylic acid and/or itaconic acid.

The emulsion polymerization of these styrene copolymers can lead to polymer particles with a highly uniform average primary particle size of from about 0.3 to 1.5 $\mu$m in which most of the polar carboxyl groups are positioned on the outside and, as lipophobic residues, are clearly responsible for the stability of the dispersions of these particles in the plasticizer at room temperature. These copolymers have a molecular weight of the order of 200,000 to 1,000,000.

The aqueous polymer dispersions are normally dried by spray drying. In the case of chlorine-free polymers, however, this gives rise to additional problems because the very fine-particle polymer powders tend to give rise to dust explosions on account of their very low minimum ignition energy. To eliminate this risk during the drying process, the chlorine-free polymer dispersions have to be spray-dried under inert conditions which adds considerably to the production costs of the polymer. Accordingly, there was a need to provide chlorine-free polymer powders for use in plastisols which would not have to be expensively spray-dried under inert conditions.

SUMMARY OF THE INVENTION

It has now been found that plastisols suitable for use as adhesives, sealing compounds and/or coating compositions can be produced from certain bead polymers—after simple filtration and subsequent drying—and plasticizers and other typical additives.

DETAILED DESCRIPTION OF THE INVENTION

Bead polymerization, also commonly known as suspension polymerization, has been known per se for some time. In this process, the substantially water-insoluble organic monomer is suspended in aqueous phase using protective colloids and/or stabilizers as dispersion aids, more or less coarse polymer particles being formed. Water-insoluble inorganic salts are frequently used as the protective colloids and/or stabilizers. These inorganic salts are normally separated from the polymer during working up and removed, for example by treatment with acids.

It has now surprisingly been found that the inorganic constituents can remain in the polymer which makes the working-up process particularly simple and hence economical.

Accordingly, the present invention relates to plastisol compositions based on bead polymers which, on completion of the polymerization process, are filtered off from the aqueous phase without further treatment and are then freed from their residual moisture content in a conventional drying process.

The dispersion aids are selected so that, at least, they have no adverse effect on the composition of the plastisol. In a preferred embodiment, they are at least partly a normal constituent of the plastisol. Accordingly, the inorganic component of the dispersion aids—also known as Pickering emulsifiers—is preferably barium sulfate, calcium carbonate, magnesium carbonate, calcium silicate or an alumosilicate. Ionic or nonionic emulsifiers, such as sodium cetostearyl alcohol sulfate for example, are additionally used in small quantities.

In principle, any substantially water-insoluble monomers capable of radical polymerization may be used for this suspension polymerization process, although styrene/methacrylic acid or styrene/acrylic acid copolymers of the type described in DE-A-40 34 725 are preferably polymerized by the above-mentioned process and used in the plastisols according to the invention. The monomers may either be completely introduced at the beginning or, alternatively, only the styrene is initially introduced, the methacrylic or acrylic acid being added during the polymerization reaction. By virtue of the difference in the solubility of the monomers in the polymer and water, a concentration gradient of the (meth)acrylic acid can be established over the cross-section of the particles. This is desirable because enough carboxyl groups for subsequent crosslinking reactions and/or coupling functions are present on a statistical average in each polymer molecule. The particle size of the polymer can be varied within wide limits through the choice of the monomer concentration, the monomer-to-dispersant ratio and the speed and/or geometry of the stirrer. The average particle size of the bead polymers for the plastisols according to the invention is between 1 µm and 150 µm and preferably between 5 µm and 60 µm.

The polymer formed can be separated very easily from the water by filtration and subsequent drying at 50° C. to 150° C. and preferably at 60° C. to 100° C. and may be directly used for the production of the plastisol, the inorganic component of the dispersion aid remaining in the polymer acting as a filler required in any event for the plastisol. Since the drying process mentioned above is used solely to remove the residual moisture after filtration, the uncomplicated and, hence, inexpensive belt drying processes or fluidized bed drying may be used for this step. The minimum ignition energy for these suspension polymers is surprisingly increased by a factor of about 1,000 compared with polymers produced by spray drying in accordance with DE-A-40 34 725. This is desirable because polymers with a minimum ignition energy as high as this can be safely handled without any need for significant effort in establishing inert conditions.

In addition to the comonomers mentioned above, the comonomers mentioned in DE-A-40 34 725 may also be used so that the comonomers in question are specifically part of the present application.

The plastisol composition according to the invention contains about 30 to 1,000 parts by weight of plasticizer to 100 parts by weight of the styrene copolymer. Basically, suitable plasticizers are any of the usual organic plasticizers (cf. Paul E. Bruins, Plasticizer Technology [Weinhold Publishing Corporation, New York], Vol. 1, pages 228–232). Alkyl phthalates, such as dibutyl phthalate, dioctyl phthalate, butylbenzyl phthalate and dibenzyl phthalate are preferred, diisononyl phthalate (DINP) being particularly preferred. However, known plasticizers from the group consisting of organic phosphates, adipates and sebacates or even benzyl benzoate or diphenyl ether are also suitable.

In addition to the additives mentioned in the foregoing, the plastisols according to the invention may contain typical additives widely used in plastisol technology, including inter alia fillers, such as for example, calcium carbonate in the form of the various chalks, heavy spar, mica, vermiculite; pigments such as, for example, titanium dioxide, carbon black, iron oxides; blowing agents for the production of foamed plastisols; antiagers; flow aids such as, for example, pyrogenic silicas, Bentones, castor oil derivatives.

The plastisols according to the invention are particularly suitable for use in automobile construction as undersealing compounds and as hood-lining adhesives, as sill protection compounds and as spot welding pastes and for other adhesive applications. In the packaging industry, they may be used with advantage as sealing compounds for container closures, such as crown corks, and as seam sealing compounds and flanged seam adhesives for tin cans.

In addition, the plastisols according to the invention may be used for a number of other industrial applications, including inter alia coating compositions for wall coverings, floor coverings, textile coating compositions, for the coating of glass, for example in automobiles and other vehicles, using the process described in EP-B-333 538, as an adhesive for the production of laminated safety glass.

The invention is illustrated by the following Examples.

EXAMPLES

The polymerization reaction is carried out in a stirred reactor (R) which is equipped with a stirrer—consisting of three MIG stages—and wave breakers. The speed of the stirrer is infinitely variable. A tank (V) is used as the holding vessel. The holding vessel is weighed and connected to the reactor R by a stainless steel pipe. Metering is automatic by preselection of the corresponding metering rate. The reactor R has various heating and cooling circuits and can be operated at temperatures of 15° C. to 120° C. through two separate temperature sensors (product temperature) built into R. Nitrogen may be passed over to establish an inert atmosphere in the reactor R.

Water, styrene, initiator and emulsifier are initially introduced into the reactor. After heating to the reaction temperature (80° to 90° C.), the polymerization reaction begins through thermal decomposition of the peroxide used.

Introduction of the methacrylic acid into the reactor from the holding vessel V is gravimetrically controlled and takes place over the first 3 to 4 hours of the reaction. The total reaction time is 7 to 8 hours.

The excess heat of reaction is dissipated by temperature control of the reactor using mixing water.

The present process is a simple radical copolymerization of styrene with methacrylic acid in an aqueous suspension with a water content of around 50%. The polymerization is initiated by dibenzoyl peroxide or similar initiators substantially insoluble in water or by thermal radical formation.

On completion of the reaction, the dispersion is cooled ($\leq 45°$ C.) and drained off through a belt filter. The residual moisture is removed in a following dryer. The powder obtained may be directly used for plastisol production, storable plastisols being formed.

Example 1
Polymerization mixture A (2 liter reactor)

|  | Quantity weighed in | Parts by weight |
| --- | --- | --- |
| Water | 750.0 g | 44.2% |
| Styrene | 750.0 g | 44.2% |
| Methacrylic acid | 45.0 g | 2.6% |
| Barium sulfate | 15.0 g | 8.8% |
| Dibenzoyl peroxide | 3.8 g | 0.2% |
| Lanette E | 0.1 g |  |
| Stirrer speed: 500 min$^{-1}$ |  |  |
| reaction time: 450 mins. |  |  |

Water, barium sulfate and Lanette ER (sodium cetostearyl alcohol sulfate) are initially introduced into a 2 liter double-jacketed reactor equipped with a reflux condenser and a three-stage MIG stirrer (diameter 90% of the internal reactor diameter). The initiator dibenzoyl peroxide is dissolved in the styrene. The resulting solution is completely introduced into the reactor with stirring (defined stirrer speed). An inert atmosphere is established over the reaction mixture by passing over nitrogen. The contents of the reactor are heated to the reaction temperature over a period of 30 minutes. Once the reaction temperature has been reached, introduction of the methacrylic acid is started. The comonomer is uniformly introduced over a period of 3 hours. The course of the reaction is followed by gravimetric solids determination. After a total of 7.5 h, the polymerization reaction is terminated. The solids are filtered off through a nutsch filter and dried at around 50° C.

Analytical data:
Particle size: $X_{50} = 38$ μm
Molecular weight: $M_w = 136,000$; $M_n = 48,000$ EXAMPLE 2
Polymerization mixture B (25 liter reactor)

|  | Quantity weighed in | Parts by weight |
| --- | --- | --- |
| Water | 12,000.0 g | 61.3% |
| Styrene | 6,000.0 g | 30.6% |
| Methacrylic acid | 360.0 g | 1.9% |
| Barium sulfate | 1,200.0 g | 6.1% |
| Dibenzoyl peroxide | 24.0 g | 0.1% |
| Lanette E | 1.2 g |  |
| Stirrer speed: 300 min$^{-1}$ |  |  |
| reaction time: 450 mins. |  |  |

The reaction is carried out as in Example 1 in a double-walled glass reactor which is similarly equipped with a three-stage MIG stirrer (90% of the internal reactor diameter). The stirrer speed corresponds to the same peripheral speed as for the 2 liter batch.

Analytical data:
Particle size: $X_{50} = 106$ μm
Molecular weight: $M_w = 316,000$; $M_n = 107,000$ EXAMPLE 3
Plastisol formulation

|  | Quantity weighed in | Parts by weight |
| --- | --- | --- |
| SMA Polymer of Example 1*) | 41.6 g | 43.9% |
| Barium sulfate | 4.4 g | 17.2% |
| Diisononyl phthalate | 22.5 g | 29.9% |
| Aerosil 200 | 0.3 g | 0.4% |
| Versamid 140 | 1.5 g | 2.0% |
| Dicycloheptyl phthalate | 5.0 g | 6.6% |

*): 79% of the quantity of SMA polymer weighed in consists of polymer and 11% of barium sulfate (corresponding to the polymerization formulation)

The plastisol is prepared to the formulation mentioned above in a glass beaker and homogenized.

To test stability in storage, viscosity measurements were carried out with a CARRI-MED CS rheometer (plate/plate; diameter=4 cm). Measurements of the freshly prepared plastisol and after 3 days at 25° C. produced substantially the same viscosity values in Pas in dependence upon the shear rate in 1/sec.).

No significant gelation was observed. After application of a film (400 μm) to a metal panel and subsequent heating (15 minutes at 160° C.), homogeneous, visually attractive and mechanically stable (visual evaluation) coatings were obtained.

What is claimed is:
1. A plastisol composition comprising a bead polymer comprised of a copolymer comprised of one or more monomers selected from the group consisting of styrene, α-methyl styrene, and p-methyl styrene, and from 2% to 20% by weight, based on the copolymer, of an olefinically unsaturated carboxylic acid and at least one water-insoluble inorganic salt, wherein said bead polymer has a core/shell structure.

2. A plastisol composition as claimed in claim 1 wherein said olefinically unsaturated carboxylic acid is one or more members selected from the group consisting of methacrylic acid, acrylic acid, and itaconic acid.

3. A plastisol composition as claimed in claim 1 further comprising a crosslinking comonomer.

4. The composition of claim 1, wherein said water-insoluble inorganic salt is selected from the group consisting of barium sulfate, calcium carbonate, magnesium carbonate, calcium silicate, aluminosilicates and mixtures thereof.

5. A plastisol composition as claimed in claim 1 wherein the primary particles of said bead polymer have an average diameter of 1 to 150 μm.

6. A plastisol composition as claimed in claim 1 wherein the primary particles of said bead polymer have an average diameter of 5 to 60 μm.

7. A plastisol composition as claimed in claim 1 comprised of:
   a) 5 to 50% by weight of said bead polymer,
   b) 5 to 60% by weight of a plasticizer, and
   c) 5 to 40% by weight of fillers.

8. A plastisol composition as claimed in claim 1 further comprised of up to 10% by weight of an adhesion promoter, up to 10% by weight of a crosslinking agent, and up to 10% by weight of a flow aid.

9. In a method for the construction of a motor vehicle, the improvement comprising the use of the plastisol composition claimed in claim 1 as an undersealing compound.

10. In a method for the construction of a motor vehicle, the improvement comprising the use of the plastisol composition claimed in claim 1 as an adhesive for hood linings.

11. In a method for the construction of a motor vehicle, the improvement comprising the use of the plastisol composition claimed in claim 1 as a sill protection compound.

12. In a method for the construction of a motor vehicle, the improvement comprising the use of the plastisol composition claimed in claim 1 as a metal adhesive.

13. In a method for the construction of a motor vehicle, the improvement comprising the use of the plastisol composition claimed in claim 1 as a spot welding paste.

14. In a method for the production of packaging, the improvement comprising the use of the plastisol composition claimed in claim 1 as a sealing compound for container closures.

15. In a method for the production of packaging, the improvement comprising the use of the plastisol composition claimed in claim 1 as a seam sealing compound.

16. In a method for the production of tin cans, the improvement comprising the use of the plastisol composition claimed in claim 1 as a flanged seam adhesive.

17. In a method for the production of textiles, the improvement comprising the use of the plastisol composition claimed in claim 1 as a coating.

18. In a method for the production of wall coverings, the improvement comprising the use of the plastisol composition claimed in claim 1 as a coating.

19. In a method for the production of floor coverings, the improvement comprising the use of the plastisol composition claimed in claim 1 as a coating.

20. In a method for the production of encapsulated glass, the improvement comprising the use of the plastisol composition claimed in claim 1 as an encapsulant.

21. A plastisol composition comprising a bead polymer comprised of a copolymer comprised of one or more monomers selected from the group consisting of styrenes α-methyl styrene, and p-methyl styrene, and from 2% to 20% by weight, based on the copolymer, of one or more olefinically unsaturated carboxylic acids selected from the group consisting of methacrylic acid, acrylic acid, and itaconic acid and at least one water-insoluble inorganic salt, wherein said bead polymer has a core/shell structure, wherein the primary particles of said bead polymer have an average diameter of 5 to 60 μm.

22. A plastisol composition as claimed in claim 21 wherein said plastisol is comprised of:
   a) 5 to 50% by weight of said bead polymer,
   b) 5 to 60% by weight of a plasticizer, and
   c) 5 to 40% by weight of fillers.

23. The composition of claim 21, wherein said water-insoluble inorganic salt is selected from the group consisting of barium sulfate, calcium carbonate, magnesium carbonate, calcium silicate, aluminosilicates and mixtures thereof.

24. A process for the production of the plastisol composition comprising suspension polymerizing, dispersed in an aqueous phase, one or more monomers selected from the group consisting of styrene, α-methyl styrene, and p-methyl styrene, and from 2% to 20% by weight, based on the resulting copolymer, of olefinically unsaturated carboxylic acids and at least one water-insoluble inorganic salt to form a bead polymer, separating said bead polymer from the aqueous phase by filtration, and drying the separated bead polymer at about 50° C. to about 150° C. and wherein said bead polymer has a core/shell structure.

25. A process as claimed in claim 24 further comprising an ionic and/or nonionic emulsifier as dispersion aids in said suspension polymerizing.

26. The composition of claim 21, wherein said water-insoluble inorganic salt is selected from the group consisting of barium sulfate, calcium carbonate, magnesium carbonate, calcium silicate, aluminosilicates and mixtures thereof.

27. Plastisol compositions produced by the process of claim 24.

* * * * *